June 28, 1938.  L. M. KEEFE  2,122,206

TRANSLATOR FOR RECORD CONTROLLED MACHINES

Filed June 21, 1933  5 Sheets-Sheet 3

INVENTOR
Lincoln M. Keefe
BY
Van Doreter + Grier.
ATTORNEYS

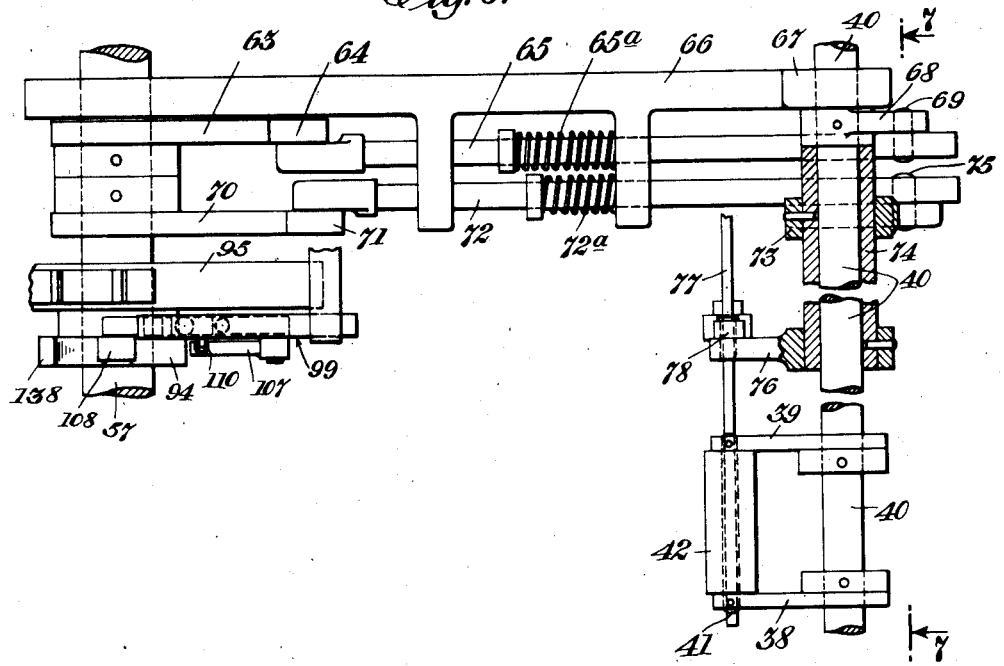

June 28, 1938.   L. M. KEEFE   2,122,206
TRANSLATOR FOR RECORD CONTROLLED MACHINES
Filed June 21, 1933    5 Sheets-Sheet 5

Fig. 9.

INVENTOR
Lincoln M. Keefe
BY
Van Deventer & Grier
ATTORNEYS

Patented June 28, 1938

2,122,206

UNITED STATES PATENT OFFICE 2,122,206

TRANSLATOR FOR RECORD CONTROLLED MACHINES

Lincoln M. Keefe, Springfield, Mass., assignor to Remington Rand Inc., Buffalo, N. Y., a corporation of Delaware Application June 21, 1933, Serial No. 676,820

25 Claims. (Cl. 235—61.9)

This invention relates to improvements in record controlled machines of the pin sensing type, and has for an object the provision in devices of this character of a self-contained removable translator by means of which electrical paths or circuits are completed by the mechanical operation of the sensing pins and electrical impulses via these paths or circuits release moving interposers which control the operating, adding and/or printing functions of the machine.

Another object of the invention is the provision in record controlled machines of the pin sensing type of a translator in which means is provided whereby the operator may connect the elements thereof to each other and thereby cause any index position on the record to control the actuators of any operative element in the machine.

A further object of the invention is the provision in a record controlled device in which the record cards are stationary while being sensed by the analyzing pins of the device, of a plurality of interposers, one for each card column used, each positioned adjacent to a row of stops for controlling the operation and functioning of the device, moving said interposers in timed relation to a definite portion of an operating cycle of the device, the provision of electrical releases associated with the interposers and adapted to be selectively connectable to the sensing means, and the provision of means for energizing successively, in accordance with the horizontal rows and vertical columns of the index point positions on the cards, circuits completed by the movement of the sensing pins.

Another object of the invention is the provision in record controlled machines of the pin sensing type of means for substituting electrical impulses having time, sequence and position values for the mechanical impulses having position values only.

A further object of the invention is the provision in a tabulator-printer in which the record cards are stationary while being sensed by a pin sensing means, of interposers moving in timed relation to a definite portion of the operating cycle of the tabulator, and the provision of means for passing electrical energy, via contactors actuated by the sensing means, in timed relation to the movement of the interposers and in accordance with the time, sequence and position values of indicia on the cards.

Another object of the invention is the provision in mechanical tabulating and printing machines, between the analyzer and the type segment stops, of a universal electrical translator adapted to increase the flexibility and utility of such machines.

A further object of the invention is the provision in a record controlled device, of a plurality of contacts, each pair of which cooperates with an analyzer pin, having these contacts terminate in jacks, the provision of a plurality of interposers moving in timed relation to the operating cycle of the device, and the provision of electrical means, also terminating in a series of jacks, for controlling the interposers so that by means of plug wires the contactors may be selectively connected to the electrical control means.

Other objects and advantages will appear from the specification and drawings in which are detailed the description of a specific embodiment of the invention shown in connection with a record controlled tabulator-printer of the mechanical type.

Such a machine is shown and described in Patent #1,245,504, to J. Powers, or #1,730,513, to W. W. Lasker. These machines are generally known to the trade as "Powers" machines.

They are also called "mechanical tabulating machines" and consist of a card feeder, a pin senser, adding, printing and control elements, and a translator between the senser and the adding, printing and control elements. The record card is stationary while being sensed and the senser consists of mechanically actuated pins, one for each index position of the card. Whereever each hole appears in a record card, a sensing pin rises and projects therethrough.

The translator consists of a plurality of push rods or wires, having their lower ends held in alignment with the sensing pins by means of suitable guides, and their upper ends held in alignment with a series of stops by means of which the adding and printing and control elements of the machine are controlled.

Wherever a sensing pin passes through a hole in the card it engages the lower end of a push wire of the translator, and in turn the upper end of the push wire raises the stop with which it cooperates, thereby controlling the position at which the type segment come to rest. Others of these push wires in the translator, when engaged by a sensing pin, may control the operating or functional elements of the machine.

The existing translator is housed in a unitary structure, such as is shown in Figures 4, 5 and 9, of the above mentioned Powers patent, and the push wires are assembled therein, in accordance with the form of record card with which it is to be used.

Within certain limits, the push wires in the translator may be arranged to conform to a given card pattern, and push wires corresponding with sensing pins of a given index position in the card may terminate in an entirely different position in the upper face of the translator casing. In some cases, where one sensing pin is required to control two type segments the push wires may be made in the form of a Y, and it is customary to make these translators up at the factory in accordance with the card form to be used.

Heretofore, it has been customary for the user of such machines to have several translators, to cover several card forms which he uses or in case it is desired to obtain several arrangements of data from a single card form, and every time the machine is used for a different card form or setup the corresponding translator is placed in the machine when setting the same up for a given operation.

In existing "Powers" machines, the indicia on the record cards have position value only, and all sensing pins, where holes appear in any card, pass therethrough simultaneously.

The present invention contemplates the provision of a universal translator which may be substituted for existing translators in machines of this character and thereby eliminates the necessity for changing translators when a different card form is used in the machine.

Instead of having a push wire for every index point position of the card as the present translators have, the improved device uses a single moving interposer for each vertical column of the card. These interposers are moved or oscillated by a mechanical driver moving in timed relation to a specific portion of the operating cycle of the machine and each interposer is adapted to actuate any one of the stops in the row in which it operates, corresponding to the index positions "0" to "9" in any given column of the card.

By means of the moving interposers the indices on or in the cards not only have position values, but have time, and sequence values also, an improved feature which was heretofore impossible in machines of this character.

A plurality of sets of contacts are provided, one set cooperating with each of the sensing pins, so that when the sensing pins pass through holes which appear in the card, the set of contact elements cooperating therewith are closed. These contact elements terminate in a plurality of jacks in a plug board.

Electricity is supplied to these contacts by a suitable impulse distributor rotated in timed relation to the movement of the moving interposers in the following sequence: In any given row, and at any given instant when the interposer is in line with the type segment stop for a "9", the contacts cooperating with the "9" sensing pin are energized; when the interposer is in line with the "8" segment stop, the contacts cooperating with the "8" sensing pin are energized, and so on.

Each of the moving interposers has an electro-magnet, cooperating therewith, by means of which an interposer may become disengaged from the oscillator drive, allowing the same to move in a plane angular with respect to its original motion, whereupon it is engaged by a suitable guide and caused to actuate a type-segment control stop. Connections to these electro-magnets also terminate in a plug board and by means of plug wires any one of the interposer control magnets may be connected to the contact cooperating with any given sensing pin, making the use of the device unlimited as to the number of card forms with which it may be used.

The construction and operation of a specific embodiment of the new and improved translator will be described in connection with a "Powers" type machine, such as that shown in Patent #1,730,513, to W. W. Lasker.

Referring to the drawings:

Figure 6 is a plane view, partly in section, showing the relative positions of the cams on the main drive shaft of the machine for oscillating the interposers and resetting the same, and also showing the position of the impulse distributor and interrupter, also on the main drive shaft;

Figure 7 is an elevation of the mechanism shown in Figure 6, as viewed in the direction of the arrows 7—7;

Figure 8 is a sectional view of a portion of the resetting mechanism as viewed along the line 8—8 of Figure 7; and Figure 9 is a diagram showing the distributor, the interrupter, and other electrical circuits in the new and improved translator.

Like reference characters refer to the same element in all of the views shown.

Figure 1:
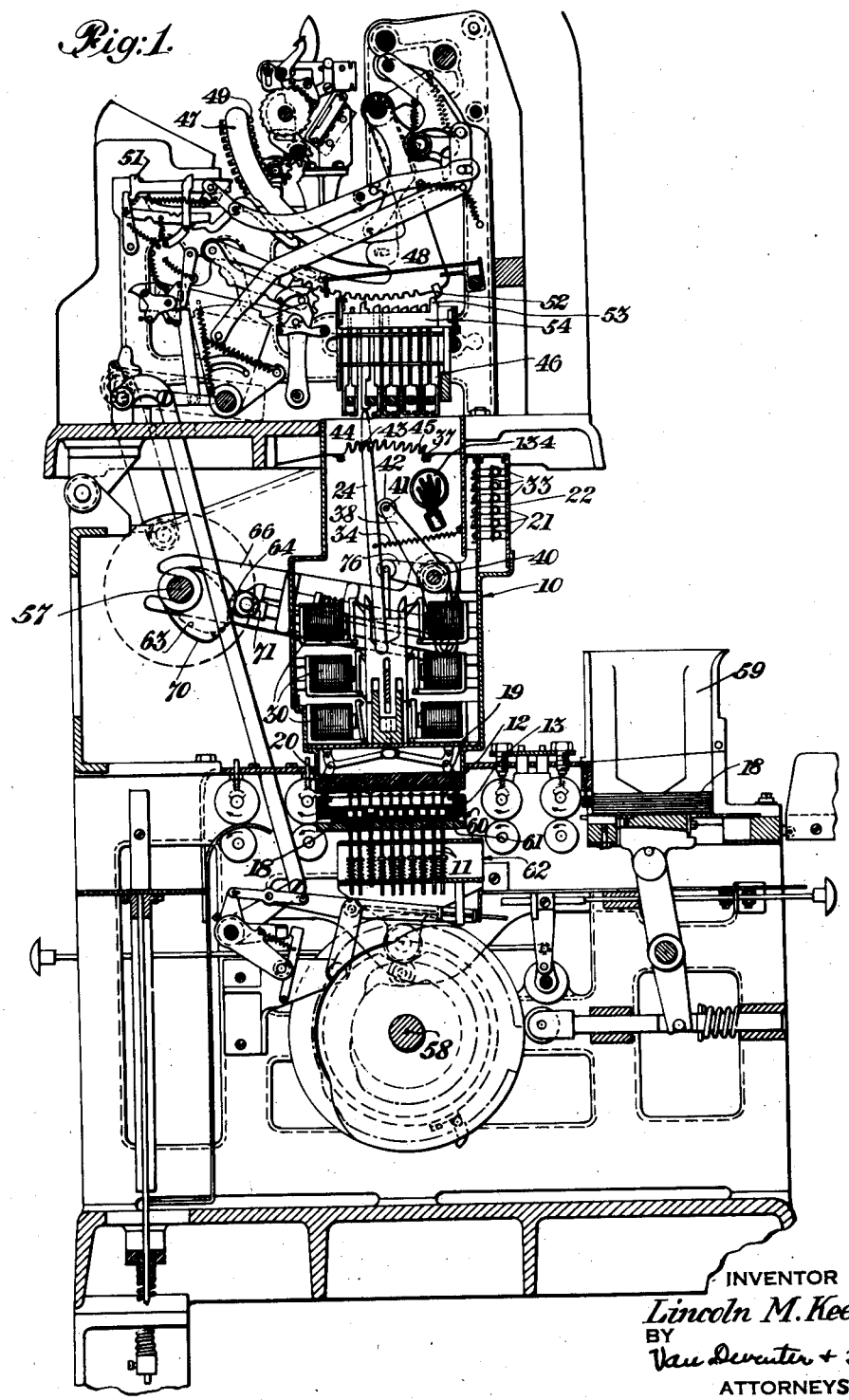
Figure 1 is a front-to-rear vertical, sectional view of a tabulator of the "Powers" type, showing the new and improved translator in operative position therein.

As the operation of the card feeding device, the sensing pins, and the adding and printing elements of the tabulating machine are well-known to those skilled in the art, the operation of these elements will not be described herein in detail. The description will be confined only to the operation of those parts as they cooperate with the elements of the new and improved translator.

The translator is housed in a unitary casing designated generally by the numeral 10. In the bottom of the casing and positioned in line with the sensing pins 11 of the tabulating machine are a plurality of movable contact members 12 which are assembled in a plurality of rows in a block of insulation 13. The movable contact members are each positioned in line with a sensing pin and there are as many movable contact members provided as there are sensing pins in the machine.

Each one of the movable contact members is secured to a rod of insulation 14 which is positioned in a hole 15 in the block of insulation 13. The hole 15 acts as a guide for the movable contact member with its rod of insulation.

Figure 4:
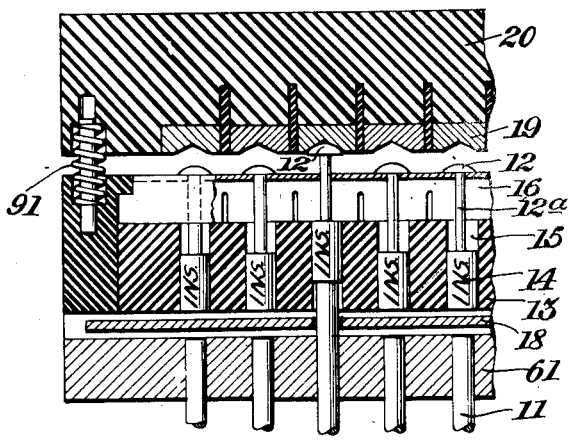
Figure 4 is a fragmentary view in cross-section of the contactor, showing how the same is operated by a sensing pin passing through a punched hole in a record card.
Figure 5:
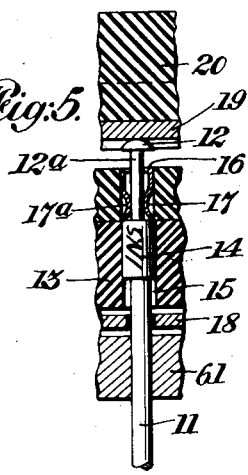
Figure 5 is a fragmentary view of one of the contactors shown in Figure 4, showing how the contact pin guide stop makes contact with the shank thereof.

A metallic channel 16 is provided with curved-in sides 17 and 17a, which make contact with the shank 12a of the contact device 12, connecting the rows of contact devices 12 together. Each row of contact devices 12 so connected correspond to a vertical column of index point positions of the record card 18. When the sensing pin 11 passes through a hole in the record 18 it engages the bottom of the insulation rod 14 and thereby pushes the movable contact member 12 upward, as in Figures 4 and 5, causing the same to make contact with the stationary contact member 19. The stationary contact members 19 are suitably secured to a block of insulation 20. These contact members correspond to the horizontal rows of index point positions on the card 18.

Each of the metallic channels which contact with the various rows of movable contact members, terminates in a jack 21 in a plug board 22, which forms a part of the casing 10.

Each of the horizontal rows of stationary contact members 19 is connected to an impulse distributor which will be presently described.

When a sensing pin 11 pushes a movable contact member 12 into engagement with the corresponding stationary contact member 19, the contact members remain in engagement until such time as they are reset as the machine approaches the end of the card cycle. The method of resetting will presently be described in connection with the resetting of other elements in the device.

A plurality of slide plates 23 are provided. Each of these slide plates has pivoted or hinged therein a movable arm 24. The slide plates 23 are also provided with slots 25 and 26, by means of which the slide plate may reciprocate upon the U-shaped frame member 27. The frame member 27 carries a plurality of springs 28, each tending to force a slide plate 23 upward.

Normally, the slide plates are held in their lowest positions by armatures 29 of the electromagnets 30. Each armature has a lug 31 which engages a cooperating lug 32, the latter of which forms an integral part of the slide plate.

To conserve space, the electro-magnets are arranged in tiers and the lugs 32 of the slide plates are so positioned that they each engage the armature of one of the electro-magnets 30. These electro-magnets terminate in jacks 33 in the plug board 22 so that any given jack 21 may be connected to any jack 33, as will presently be described.

Each one of the movable arms 24 has a spring 34 secured thereto by a suitable stud 35 and secured to the casing 10 at the point indicated by the numeral 36 in any suitable manner. These springs tend to pull the arms 24 to the right as viewed in Figure 2, and hold them normally against the bumper 37.

A plurality of supports 38 and 39 are carried by an oscillating shaft 40 and support a roller shaft 41 which in turn carries a roller 42. This roller is free to turn on the shaft 41 and as the shaft 40 rocks counter-clockwise as viewed in Figure 2, the roller 42 bears against the arms 24 and propels them to the left. When the shaft 40 has moved the roller 42 the fullest length of its stroke to the left it begins moving to the right and the arms 24, due to the tension of the spring 34, follow the roller 42 on its return stroke and continue to follow the same until they engage the bumper 37, unless previously released.

The arms 24 each have a stud 43 near the outer ends thereof, the function of which will presently be described.

Between each of the moving arms 24 there is provided a rack plate 44. This rack plate has a plurality of notches 45 adapted to be engaged by the studs 43 which may be termed "locating studs" and the notches 45 may be termed "guide slots". The locating studs and the notches, or guide slots, cooperate in the following manner: with the arms 24 oscillating in timed relation to the cycle of the machine, assumed that one of the magnets 30 is energized, the armature 29 is attracted to the core of the magnet 30, and the hooked portion thereof becomes disengaged from the lug 32 of the slide plate 23. Due to the action of the spring 28, the slide plate immediately jumps upward, as viewed in Figure 2, and the locating stud 43 engages the particular notch or guide slot 45, beneath which the locating stud 43 was located at the instant that the magnet 30 was energized. As soon as the slide plate is released and propelled upward by the spring 28, the locating stud engaging the guide slot immediately above is arrested from further oscillation and propelled upward to the extreme limit of the guide slot 45, and in so doing the outer end of the arm 24 engages and pushes up one of the type sector stops 46 of the tabulating machine.

The arms 24 which have not been released follow the roller 42 until they are engaged and stopped by the bumper 37.

The type sectors 47 are movable with the actuators 48 to bring the desired type 49 to printing position, the type 49 being driven against a work sheet carried by a platen and paper carriage, indicated generally at 50, by suitable hammer devices 51. The actuators 48 carry stop lugs 52, normally held against forward movement by stops 53 on movable shutters 54. When one of the shutters 54 is operated during a cycle of the machine to swing its stop 53 out of the path of the respective stop lug 52, then the respective actuator 48 is permitted to move to the left. The extent of this movement is determined by the type sector stop 46, and as illustrated in the drawings, the stop 46 corresponding to a "7" index point position in the card being raised, the stop lug 52 of the actuator 48 will engage the type sector stop 46 and stop in such a position that the type sector 47 will stop with the type 49 in line with the hammer 51, so that when the latter operates, a "7" will be printed.

The accumulator gears 55 are adapted to be thrown into or out of mesh with the racks 56 carried by the actuators 48. This engagement and disengagement always takes place either when the racks have completed their movement in one direction or the other, or are at rest in normal position. The time of such engagement or disengagement is opposite for total-printing to what it is for item-printing. A dwell is therefore made at each of these points, to insure the correct meshing of the pinions with the racks. As this is well-known in the art, it is not here described in detail.

A shaft, indicated by the numeral 57, rotates once for each card cycle of the machine.

A shaft 58, which may be termed the "main drive shaft" of the machine, also makes one revolution for each card cycle of the machine. The shaft 58 effects the reciprocation of the sensing pin box, and the shafts 57 and 58 run in synchronism to effect the various functions of the machine in proper time or sequence.

In normal operation the cards 18 are fed from a magazine 59 into a card throat, generally designated by the numeral 60 and formed between the insulating block 13 and the sensing pin guide plate 61. In Figure 1, the card is shown in the throat 60 and the pin box 62 is shown in its extreme upper or raised position.

The card 18 shown in the throat 60 is stationary while being sensed, and one perforation in the card registers with one of the sensing pins 11, so that that particular pin has passed through the perforation and has raised the movable contact member 12 into contact with the corresponding stationary contact member 19. The perforation in the card is for example a "7" index point position.

A cam 63, secured to the shaft 57, which may be termed an "oscillating arm cam", has cooperating therewith a roller 64. This roller is supported in cooperative relation with the cam 63 by a push rod 65. This push rod is suitably supported in bearings in the stationary member 66, which also serves as a distancer between the shafts 57 and 40, and is normally held against the cam 63 by the spring 65a.

The shaft 57 is an integral part of the tabulating machine, and the shaft 40 is an integral part of the new and improved translator, and is suitably supported in the casing 10 by bearings, one of which is shown at 67.

The push rod 65 is connected to the crank arm 68 by a suitable pivot pin 69, and the crank arm 68 is keyed, or otherwise secured to the shaft 40. When the shaft 57 is rotated, the cam 63 via the roller 64 moves the push rod 65 with an oscillating motion and this motion is imparted to the shaft 40 via the pivot pin 69 in the crank arm 68, therefore, the roller 42, carried by the supports 38 and 39 which are secured to the shaft 40, engaging the movable arms or interposers 24, imparts an oscillatory motion to said arms, causing them to move from left to right and return during one card cycle of the machine. This corresponds to one revolution of the shafts 57 and 58.

A reset cam 70 is also secured to the shaft 57 and has a roller 71 cooperating therewith. This roller is rotatably supported on a push rod 72. A crank arm 73 is keyed or otherwise secured to a sleeve shaft 74, which may be termed a "reset shaft". This sleeve shaft 74 surrounds and is journaled upon a portion of the length of the shaft 40. The crank arm 73 is connected by a suitable pivot pin 75 to the push rod 72. A crank arm 76 is keyed or otherwise secured to the reset shaft 74 and serves to actuate the reset bar 77. The linkage between the crank arm 76 and the reset bar 77 consists of a push rod 79, having one end thereof secured to the crank arm 76 by a pivot pin 78, and the other end thereof is made in the form of a yoke 80, having a socket 81 formed therein. A suitable ball 82 is secured to the reset bar 77 and this ball may be a solid steel ball located in a hole in the reset bar 77, or it may be formed of two members riveted thereto in the form of a ball.

When the reset cycle of the machine is operating, the cam 70, via the roller 71, pushes the push rod 72 and this motion is imparted to the shaft 74 via the pivot pin 75 and the crank arm 73. The motion of the shaft 74 is imparted to the reset bar 77 via the crank arm 76, the pivot pin 78, the push rod 79 and its yoke 80, with the ball 82 thereby moving the reset bar downward, as viewed in Figure 7.

The reset bar 77 is adapted to be reciprocated in the rectangular slots 81 in the slide plates 23. During the normal operating cycle of the machine, the reset bar 77 is normally held near the upper ends of the rectangular slots 81 in the slide plates 23, but during the reset cycle the motion of the shaft 74, due to the action of the cam 70 above described, is imparted to the reset bar 77, causing said bar to move downward in the slot 81. This movement carries down all of the slide plates 23 that have been actuated, whereupon the slide plate lugs 32 are engaged by the armature lugs 31. These slide plates are held in a down position against the tension of the springs 25 by the armature lugs 31 until such time as any of the magnets 30 actuate the armatures 29 for releasing any of the slide plates 23.

At the same time that the reset cam 70 is actuating the reset bar 77, a push rod 82, actuated by the reset push rod 79, pushes the toggle arms 83 and 84 downward. The arms 83 and 84 are respectively pivoted on the bottom plate 85 by pivot pins 86 and 87, and are respectively connected to the stationary contact block 20 by the links 88 and 89.

The contact member assembly 20 is moved downward by the action of the push rod 82 against the toggle arms 83 and 84, thereby pushing down any of the movable contact members which had been actuated by any of the sensing pins 11 (the sensing pins having finished sensing the card 18 and having receded to normal position).

When the resetting bar 77 is returned to its normal position at the upper end of the slot 81 by the action of the cam 70, the push rod 82 has also moved upward, allowing the springs 90 and 91 to push the contact member assembly 20 up to normal position against the stops 92 and 93.

Having described the mechanical operation of the device, the method of supplying electrical impulses thereto in timed relation to a portion of the working cycle of the tabulating machine will now be described. Although the record is stationary while being sensed, and in using the old type of translator in which the motion of a sensing pin is imparted to the type segment setting bar by a push wire giving an index point position on the card position value only, the new and improved translator and the method of setting up and distributing electrical impulses gives the index positions in the cards not only position value, but also time and sequence values. The shaft 57 also has secured thereto an interrupter 94 and an impulse distributor rotor 95.

Referring to Figure 9, showing the electrical circuits, a circuit may be traced as follows: from the positive terminal 96 of the machine via the fuse 98 to the stationary arm 100 of the interrupter, generally designated by the numeral 99, and from the movable arm 101 via the wire 102 to the impulse distributor brush 103.

The interrupter is provided with a pair of contacts 104 of high conductivity, for example, of silver, and a second pair of contacts 105 of tungsten, or material adapted to withstand a spark without wasting away excessively. An interrupter actuating arm 106 is pivoted on a suitable support 107 and carries a suitable bumper or roller 108 adapted to cooperate with the cam 94. An extension 109 of the actuating arm 106 engages the movable arm 101 of the interrupter 99, and a spring 110 is provided for holding the roller 108 in contact with the cam 94.

When the cam 94 raises the actuating arm via the roller 108, the extension 109 raises the movable arm 101. The stationary arm 100 is laminated so that the contacts 104, due to the movement of the arm 101, open an instant earlier than the contact points 105. This is to ensure that there will be no sparking between the contacts 104 and that the spark will be thrown on the contacts 105.

A condenser 111 is connected in parallel with the pairs of contacts 104 and 105 to absorb the major portion of the spark. However, a tiny bit of sparking at the points 105 is beneficial as it tends to keep the surfaces of these contact points clean.

The impulse distributor rotor 95 is made of insulating material with a segment 112 set into a portion of the surface thereof, and adapted to lead current from the brush 103 to various other brushes, which will now be described.

A plurality of brushes 113, 114, 115, 116, 117, 118, 119, 120, 121 and 122, along with the brush 103, are supported by a sector-shaped block of insulation 123. These brushes contact with the surface of the distributor rotor 95 and are preferably spaced equi-distant each from the other, and when the ends thereof are in contact with the face of the distributor rotor 95, the points of contact between any two adjacent brushes is equal to the points of contact between any two other adjacent brushes. The brush 113 is connected by the wire 124 to the stationary contact member 19, which is positioned above the movable contact 12, which cooperates with the sensing pin 11, which corresponds to the "9" index position in the card. The brush 114 is connected by a wire 125 to the stationary contact member 19, which cooperates with the "8" sensing pin, and its movable contact member 12. The brush 115 is connected by the wire 126 to the stationary contact member positioned above the "7" sensing pin and its movable contact member, and so on, the last brush 122 being connected by the wire 133 to the stationary contact member 19, which is positioned above the "0" sensing pin and its cooperating movable contact member 112.

The wires 124 to 133, inclusive, are connected to a suitable separable plug 134, by means of which in event the interposer is removed from the machine it may be dis-connected from the impulse distributor which is mounted outside the casing 10 of the device and is not shown as a unitary part of the casing structure.

It is obvious that the shaft 57 could be positioned in line with the casing 10, in which event the interrupter and the impulse distributor could be positioned within the casing 10.

Figure 2:
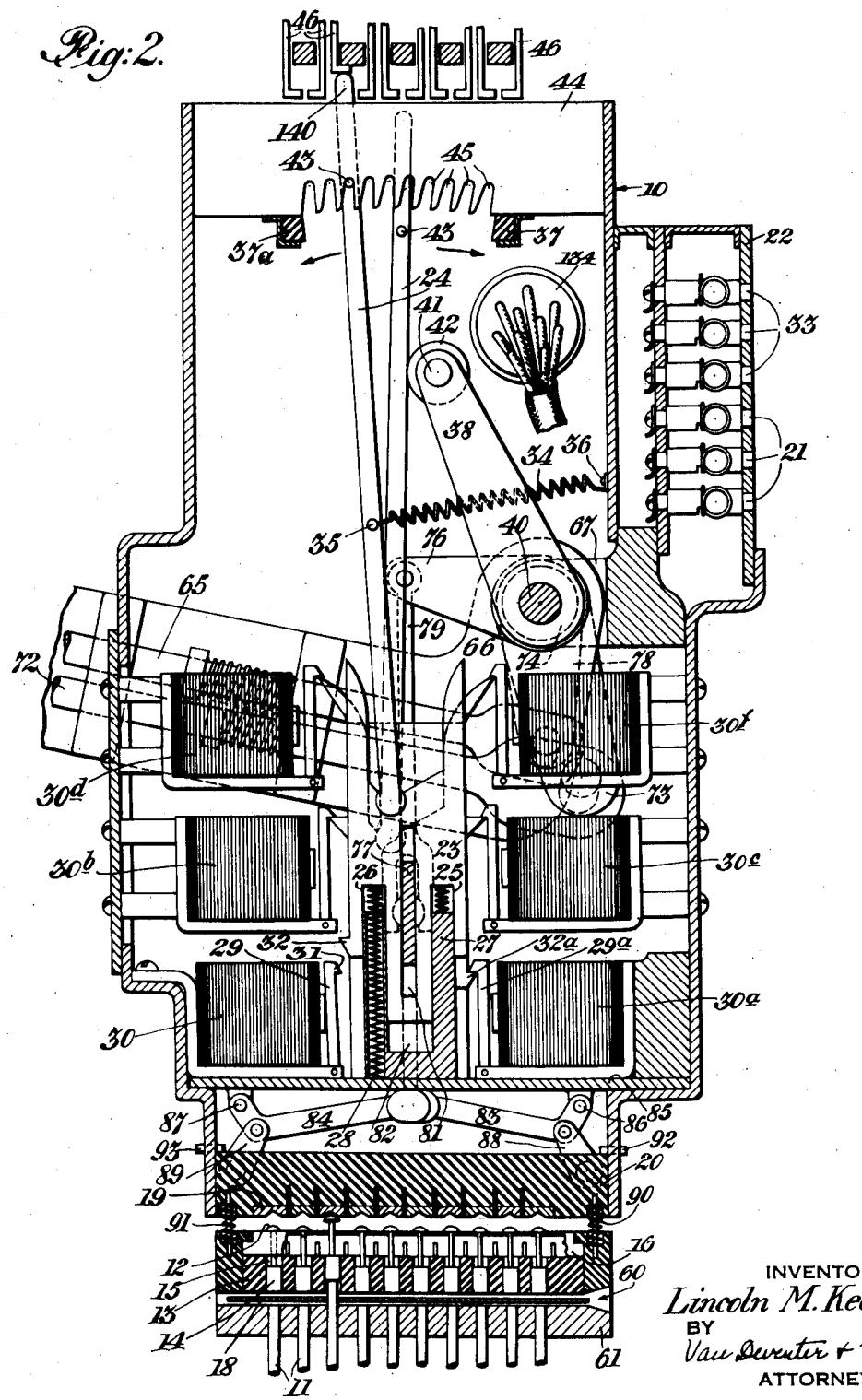
Figure 2 is a cross-sectional view of the improved translator, constituting a preferred embodiment of the invention, and showing details of its construction.
Figure 3:
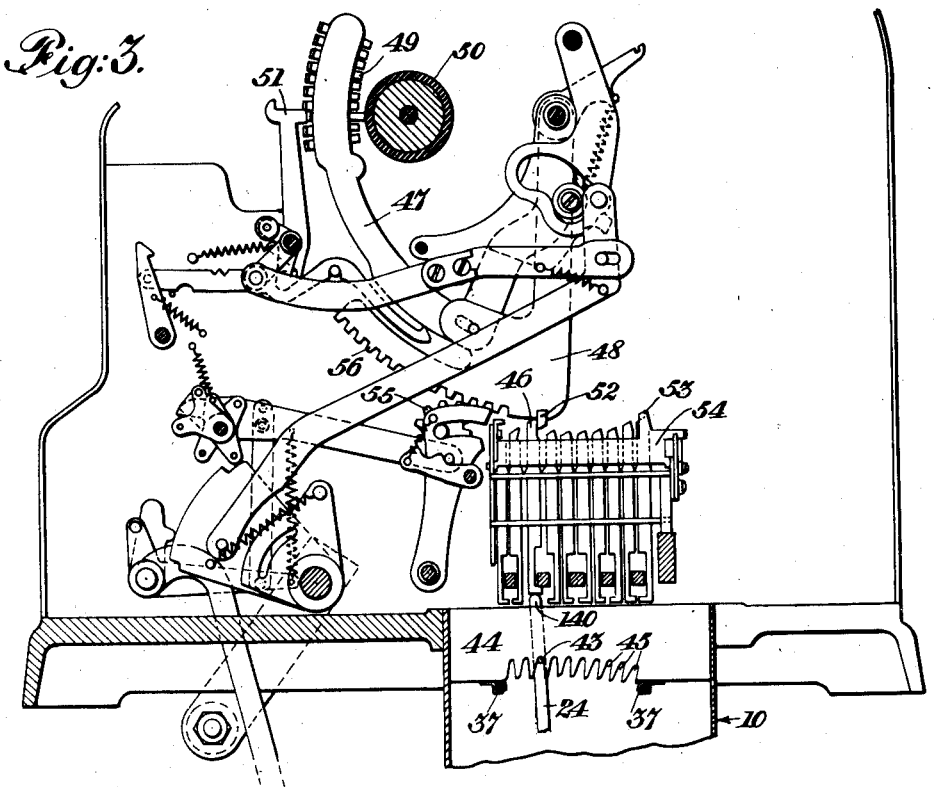
Figure 3 is an enlarged view of the upper portion of Figure 1, showing the operation of the printing mechanism of the machine.

One-half of this separable plug 134 is shown in Figures 1 and 2, and indicated conventionally in Figure 9.

The metallic channel 16, contacting with all of the movable contacts 12 in any given row (corresponding to a vertical column in the card) is connected via the wire 135 to a jack 21, as previously described.

The magnet coils 30 are each connected to jacks 33 in the plug board 22. One of these jacks 33 is indicated in Figure 9, as connected to the magnet coil 30 by the wire 135. The other side of the magnet winding 30 is connected to a fuse 136 by the wire 137 and a wire 138 connects the fuse 136 to the negative terminal 97 of the device.

A plug wire 139 is shown connecting the jack 21 to the jack 33, thereby connecting the magnet coil 30, corresponding to the wanted vertical column on the card, with the corresponding metallic channel 16.

The operation of the device will be described in connection with a single vertical column in the card in which a hole is punched in the "7" index point position. The card 18 is advanced from the magazine 59 into the card throat 60 in the usual manner and as the "7" is the only hole punched in the column being described, the sensing pin 11 beneath the "7" position passes upward through the hole in the card in the usual manner.

The sensing pin 11 passing through the "7" hole in the card engages the bumper 14 of the movable contact member 12, pushing the same upward and in contact with the stationary contact member 19 with which it cooperates, thereby forming a path through which an electrical impulse may be passed.

While the card 18 is being sensed, the moving arms 24 are moved to the left, as viewed in Figures 1 and 2, by the action of the cam 63 imparting motion to the oscillating shaft 40, and the roller 42 connected thereby. This swinging to the left of the arms 24 is accomplished preferably during the sensing period, so that when the latter is completed the moving arms 24 can be swung to the right in timed relation to the movement of the distributor rotor 95, interrupter cam 94 and a portion of the operating cycle of the machine.

During the sensing period, the high part, or bump 138 of the interrupter cam 94 engages the roller 108, and thereby holds the contacts 104 and 105 open, so that no current can flow through any of the circuits. At the same time, the brushes 103 and 113 to 122, inclusive, are not in contact with the metallic segment 112 of the distributor rotor 95, therefore, no current can flow therebetween.

After the sensing period, the roller 108 rides down off of the bump 138 of the cam 94 (the cam being rotated as indicated by the arrow), thereby allowing the pairs of contacts 104 and 105 to close, whereupon current may pass to the brush 103. At the same time, the rotor 95 of the impulse distributor has also advanced in the direction of the arrow, and the metallic segment 112 thereof contacts the brush 103.

At the same time the moving arm 24 starts moving to the right, as viewed in Figures 1 and 2, and at the time that the metallic segment 112 contacts the brush 113 the moving arm 24 is immediately below the left end guide slot 45 in the rack plate 44, and if the sensing pin 11 on the extreme left, as viewed in Figures 1 and 2, had pushed its cooperating movable contact 12 against the stationary contact 19 immediately above, current would flow from the positive terminal 96 via the interrupter contacts and the wire 102 to the brush 103, and from the brush 103 via the segment 112 to the brush 108, and from the brush 113 via the wire 124, via the end contacts (if they had been established) via the channel 16 to the jacks and plug wire, then via the magnet coil 30 to the negative terminal 97 of the device. As contact between the members 12 and 19 was not established, due to the fact that no hole was punched in the "9" position, nothing happened.

When the moving arm 24 is in line with the second guide slot 45, the segment 112 has advanced in the direction of the arrow, and is in contact with the brush 114 corresponding to the "8" position in the card column, but as the second set of contacts 12 and 19 are not closed, nothing happens.

When the moving arm 24 is in line with the third guide slot 45, the metallic segment 112 of the distributor has advanced in a position to contact with the brush 115, corresponding to the "7" index position in the card column.

As the "7" is the index point position punched in the card, and as the sensing pin 11 corresponding to this position has established contact between the contact members 12 and 19, current can and does flow as follows: from the positive terminal of the device via the fuse 98 to the stationary arm 100 of the interrupter, via the contact points 104, 105, to the movable arm 101, via the wire 102 to the brush 103, from the brush 103 via the segment 112 to the brush 115, then through the wire 126 to the stationary contact member 19 in the "7" position, via the contact member 12 and the channel 16 through the wire 135 to the jack 21. Current flows from the jack 21 through the plug wire 139 to the jack 33, thence via the wire 135 to the magnet coil 30 and via the return wire 137, the fuse 136 and the wire 138 to the negative terminal 97 of the device. Current flowing through the magnet coil 30 energizes the same, thereby attracting the armature 29.

The movement of the armature 29 allows the armature lug 31 to disengage the slide plate lug 32, whereupon the action of the spring 25 pushes the slide plate 23 vertically, as viewed in Figures 1 and 2, whereupon the stud 43 on the arm 24 engages the guide slot 45 with which it is in line (corresponding to the "7" position), and the end 140 of the arm 24 engages the type sector stop 46 immediately above, and pushes the same upward. It will be noted that this stop 46 is third from the left hand side, which also corresponds to a "7" position.

The other movable arms 24 which have not been actuated, follow the roller 42 and at the end of the stroke to the right are engaged by the rubber bumper 37 and remain in this position during the adding and printing cycle of the machine, in which the actuator 48 swings the type sector 47 up to the "7" position with the "7" type 49 in line with the paper carriage 50, so that when the hammer 51 is released, it strikes the type 49 and prints a "7". During the movement of the actuator 48, the rack 56 thereon engages the accumulator gears 55 and they function in the usual manner.

If more than one hole had been punched in the card column described, say, for example, a "7" and a "5", it is obvious from the circuit diagram, Figure 9, that the moving arm would be released when the contacts corresponding to the "7" index point position were excited by the distributor, and the moving arm would engage the "7" type segment stop, as above described, and when the sector 112 reached the brush 117 corresponding to the "5" position, current would flow through the magnet 30 and move the armature 29, but as the armature 29 at this time is not engaging a slide plate 23 (the slide plate having been disengaged by the "7") nothing would happen and the machine would print a "7" rather than a "5".

After the adding and printing cycle of the machine is completed, the reset bar, actuated by the cam 70, and the intermediate mechanism, moves downward, bringing with it any of the slide plates 23 that have been actuated, and they are again engaged and held down by the armature 29, and at the same time the push rod 82 via the toggles 83 and 84 resets the movable contact members 12, as above described.

The new and improved translator may be set up for any desired card form by connecting any of the given jacks 21 to any desired jack 33, thereby doing away with the necessity for having to have a separate translator for each card form used, and for having to remove one translator from the machine and substitute another when cards of a different form are to be run through the machine.

A plurality of groups of jacks, for example, connected together in groups of three or four (not shown) may be provided for connecting a single metallic channel 16 to a plurality of electro-magnet jacks 33, and thereby cause several electro-magnets 30 to be operated by a single impulse via the channel 16.

It will be noted that the moving elements each consisting of an arm 24 and the slide plate 23 on which it is pivoted are each oscillated mechanically in a plane radial with respect to the pivot, and that this member when released by the action of the electromagnet 30 is moved mechanically in a plane angular in relation to the oscillating plane by the action of the spring 28.

In tabulating machines of the character referred to above, the sensing pins all pass through holes in the record simultaneously. In existing translators of the push rod type, a push rod is provided for every index point position in the record card, so that when the sensing means operates, the push rods cooperating with sensing pins which have passed through the holes in the record, simultaneously set stops which control the movement of the type segments and/or the functioning controls of the machine.

The operating cycle of the machine may be considered as a series of periods, as follows: an analyzing period in which the record is fed to the sensing pins, an accumulating and printing period in which the data from the records are accumulated and/or printed, and a reset period in which the elements of the machine are conditioned to operate for a succeeding card or record cycle.

In the new and improved translator herein described, each one of the moving arms travels in a path adjacent to, and is adapted to actuate any one of, a plurality of stops corresponding to the index point positions in one vertical column of the record card. The moving arm travels in timed relation to a definite portion of the operating cycle of the machine and in the preferred embodiment of the invention the arm is caused to move during the later portion of the analyzing period and just ahead of the accumulating and printing period.

In timed relation to the movement of the arms, a series of impulses are distributed to electrical paths or circuits which were completed during the sensing period. The term "electrical period", as used herein, may be termed the period in which the pivoted arms are being moved and simultaneously impulses are being distributed to electrical paths completed by the sensing means.

What is claimed is:

1. In a translator for record controlled machines, a support, a reciprocative slide plate carried by said support, a movable arm pivotally supported by said slide plate, a rack plate having a plurality of notches formed therein, a spring adapted to move said slide plate in one direction on said support toward said rack plate, a resetting device adapted to move said slide plate in an opposite direction against the urge of said spring, means engaging said slide plate and retaining the same in its reset position, means for oscillating said arm, and means including a magnetic release for releasing said slide plate from said engaging means to permit said arm to engage one of the notches in said rack plate thereby permitting one member of the means for oscillating to move out of engagement with said arm.

2. In a translator for record controlled machines, a support, a reciprocative slide plate carried by said support, a movable arm pivotally supported by said slide plate, a rack plate having a plurality of notches formed therein, a spring urging said slide plate toward said rack plate, means engaging said slide plate and retaining the same against the urge of said spring, means driven in timed relation to the operating cycle of said machine for oscillating said arm, means under control of records in said machine for releasing said slide plate from said engaging means thereby permitting said spring to move said plate and the arm carried thereby to a point where the arm engages one of said notches in the rack plate and a resetting device adapted to move said slide plate in one direction against the urge of said spring.

3. In a translator for record controlled machines, a support, a reciprocative slide plate carried by said support, a movable arm pivotally supported by said slide plate, a lug carried by said movable arm, a rack plate having a plurality of notches formed therein, a spring adapted to move said slide plate toward said rack plate, means engaging said slide plate and restraining the same against the pressure of said spring, means driven in timed relation to the operating cycle of said machine for oscillating said arm, means under control of records in said machine for releasing said slide plate from said engaging means thereby permitting the spring to propel the slide plate and the arm carried thereby toward said rack plate and permitting said lug to engage one of said notches, and a resetting bar moving during another portion of the operating cycle of said machine and adapted to move said slide plate in a direction opposite to said first movement and against the pressure of said spring.

4. In a translator of the character described an interposer comprising a pivoted arm adapted to be moved in a path adjacent to a plurality of control stops in a record controlled machine, a slide plate supporting said arm, a spring adapted to propel said plate and arm toward said stops, an armature comprising a latch engaging said plate and holding the same against the force of said spring, mechanical means for oscillating said arm, and electrical means for releasing said latch and allowing said spring to mechanically propel said plate and arm toward said stops thereby causing said arm to engage and actuate one of the stops in said plurality.

5. A device as claimed in claim 4 including a rack plate having notches formed therein corresponding to said plurality of stops, each of said notches being adapted to line said arm up with one of said stops.

6. In a translator for record controlled machines, a support, a reciprocative slide plate carried by said support, a movable arm pivotally supported by said slide plate, means for oscillating said arm during a portion of each record cycle, spring means urging said arm against said oscillating means, a rack plate having a plurality of notches formed therein, spring means urging said slide plate toward said rack plate, a magnetic latch restraining said slide plate against the urge of said last spring means, and means under control of the records for energizing said magnetic latch to release said slide plate thereby permitting said arm to engage one of said notches in the rack plate whereupon a mechanically moving member of the oscillating means moves out of engagement with said arm.

7. In a translator of the character described for setting stops controlling setups in a tabulating machine in combination, a slide, an arm pivotally mounted on said slide and adapted to engage and set one of said stops, means for oscillating said arm, a notch in said slide, a spring adapted to propel said slide to cause said arm to engage a stop when the slide is released, an armature member adapted to engage said notch and restrain said slide against the urge of said spring, and a magnet adapted to actuate said armature to effect the release of said slide.

8. In a translator adapted to be positioned between the sensing means and stops controlling set-ups in the operative elements of a tabulating machine, a casing, a support mounted within said casing having at least one slot formed therein, a slide plate adapted to reciprocate in said slot, a spring associated with said slide plate tending to push the same in one direction in its slot, a trigger cooperating with said slide plate for holding the same near the bottom of its slot, a movable arm pivoted on said slide plate, means for oscillating said arm radially with respect to said pivot, a lug carried by said arm, a rack plate for and adjacent to the end of said arm, having notches formed therein adapted to be engaged by said lug, and electrical means under control of records in said machine for releasing said trigger and permitting said slide plate to move until said lug engages one of said notches and the end of the arm engages and sets one of said stops.

9. In a translator adapted to be positioned between the sensing means and the operative elements of a tabulating machine, a casing, a support mounted within said casing having at least one slot formed therein, a slide plate adapted to reciprocate in said slot, a spring associated with said slide plate tending to push the same in one direction in its slot, a trigger cooperating with said slide plate for holding the same near the bottom of its slot, a movable arm pivoted on said slide plate, means including mechanism carried by an operative shaft in said machine for oscillating said arm on said pivot, and electromagnetic means for releasing said trigger and allowing said spring to move the slide plate in said slot, thereby causing said arm to engage one of said elements.

10. In a translator adapted to be positioned between the sensing means and a row of stops controlling set-ups in an entry device of a tabulating machine, a casing, a rack plate having a plurality of notches formed therein, adjacent to said row of stops, a support mounted within said casing having at least one slot formed therein, a slide plate adapted to reciprocate in said slot, a spring associated with said slide plate tending to push the same toward said rack plate, a trigger cooperating with said slide plate for holding the same near the bottom of its slot against the tension of said spring, a movable arm pivoted on said slide plate, a lug carried by said arm, means including mechanism carried by a shaft in said translator for oscillating said arm on said pivot, means including an electromagnet for releasing said trigger, a contactor device adapted to be actuated by said sensing means, an electrical circuit including said contactor device and said electromagnet, and means for distributing electrical impulses to said circuit in time with the movement of said arm.

11. In a translator adapted to be positioned between the sensing means and the operative elements of a tabulating machine, a casing, a support mounted within said casing having at least one slot formed therein, a slide plate adapted to reciprocate in said slot, a spring associated with said slide plate tending to push the same in one direction in said slot, a trigger cooperating with said slide plate for holding the same near the bottom of said slot, a movable arm pivoted on said slide plate, a resetting bar moving during a portion of the operating cycle of said machine and adapted to move said slide plate in a direction opposite to said first movement and against the urge of said spring, means for oscillating said arm radially with respect to its pivot, a plurality of stops in the tabulating machine adapted to control the movement of an operative element thereof, an electromagnet for actuating said trigger, means forming a circuit including said sensing means and said electromagnet adapted to be completed upon the appearance of a perforation in the record at the sensing means, thereby energizing said electromagnet to effect the release of said trigger and to free the slide plate, thereby permitting said arm to engage and set one of said stops.

12. In a translator adapted to be positioned between the sensing means and the operative elements of a tabulating machine comprising a casing, a support mounted within said casing having at least one slot formed therein, a slide plate adapted to reciprocate in said slot, a spring associated with said slide plate tending to push the same in one direction in said slot, a trigger cooperating with said slide plate for holding the same near the bottom of said slot, a movable arm pivoted on said slide plate, an oscillating member in said translator driven by said machine, a spring associated with said arm and adapted to hold the same in engagement with said member whereby said arm is oscillated adjacent to a cooperable row of control stops in said machine, a rack plate having notches therein in line with each of said stops, a boss on said arm adapted to engage said notches, and means under control of records in said machine for releasing said trigger thereby allowing said spring to move the slide plate in said slot whereby said boss may engage one of said notches and the end of said arm may engage and actuate said stops.

13. In a record controlled machine including sensing pins adapted to read perforations in records, the combination with contact means for translating the motion of said sensing pins into electrical impulses, said means comprising a fixed support carrying a plurality of plungers electrically insulated from and actuated by said pins, a movable support carrying a plurality of cooperating contact members with which all plungers actuated by said pins establish contact, said contact members being arranged in an assembly held stationary during at least a portion of the operating cycle of the machine, and means for moving said movable support toward said fixed support for resetting said plungers.

14. In a translator positioned between the sensing means and the type control segment stops arranged in rows in a tabulating machine, a movable arm for and moved in a path adjacent to a row of said stops, means driven by said machine for moving said arm, spring means associated with said arm and adapted to maintain the same in engagement with said driven means, a movable member supporting said arm, a spring acting against said member to urge said arm toward said stops, an electrically releasable latch for restraining said member against its spring, a notched rack plate for and positioned adjacent to in parallel order with said row of stops, and a projection on said arm adapted for engagement with the notches in the rack plate adjacent to the path in which said arm moves, and means for energizing the electrical control for said latch, thereby releasing the movable supporting member associated therewith and permitting its spring to propel said last member toward said stops thereby permitting said projection on said arm to engage a notch in said rack plate whereby said arm is conducted into engagement with one of said stops.

15. In a record controlled machine including accumulating and printing means and stops for effecting set-ups therein, and pin type sensing means, a translator between the sensing means and said stops comprising, a contact member cooperating with the pins in said sensing means which pass through holes representing indicia in a given column of a record, a swinging interposer adapted to set said stops, means for swinging said interposer in time relation to the record cycles of said machine, said stops being arranged in rows and said interposer being arranged to move in a path adjacent to and in endwise relation to a row of stops, a support for said interposer movable toward and away from said stops, spring means urging said support toward said stops, a magnetic latch engaging said support for holding said support against the urge of said spring, a circuit connecting the contact members controlled by the sensing pins for said column with the magnet of said latch, and an impulse distributor rotated in time with the record cycles of said machine for associating said circuit with a source of current, whereby if a perforation permits one of said pins to complete said circuit, said latch will release said support and permit the end of said arm to engage and set the corresponding one of said stops.

16. In a record controlled machine including a type sector carrying printing elements and a pin type sensing means, a translator between the sensing means and stops controlling the setting of said sector, said stops being arranged in a row, comprising, a plunger contact associated with each of the pins in said sensing means which sense perforations in a given column of a record, cooperating stationary contacts for each of said plunger contacts, a swinging arm movable in a path in endwise relation to said row of stops and adapted when released to set one of said stops, means for swinging said arm in time relation to the record cycles of said machine, a support-plate pivotally carrying said arm, spring means urging said support-plate and said arm toward said stops, a latch holding said support against the urge of said spring, a magnet for controlling said latch, an electrical circuit including said plunger contacts, said magnet, and an impulse distributor interconnected with said stationary contacts and driven in timed relation to the record cycles of said machine for successively including said stationary contacts in said circuit, whereby when the latter is completed said magnet will be energized, thereby releasing said support from said latch and permitting the end of said arm to engage and set a stop.

17. In a record controlled machine utilizing record cards having index point positions arranged in columns, accumulating and printing means and stops arranged in rows for controlling setups therein, a sensing means adapted to analyze records while the same are at rest in said machine, circuit completing means controlled by the movement of said sensing means, impulse instituting means operating independently of the sensing means, a stop setting device, means for moving said device in a path adjacent to a row of stops, spring means associated with said device tending to urge the same toward said stops, a latch engaging said device against the urge of its associated spring means, a magnet associated with said latch for releasing the device engaged thereby, and a circuit including said release magnet, circuit completing means for one record column, and said impulse instituting means, adapted to be energized in accordance with the index point positions of perforations in the records.

18. In a translator to be positioned between the sensing means and a row of type control segment stops of a tabulating machine, a movable arm adapted to cooperate with any one of said stops, a movable member forming a support for said arm, spring means tending to move said member toward said stop, means restraining said member against such movement, means for oscillating said arm, means for releasing said member from said restraining means, and a rack plate having notches formed therein adapted to be engaged by said arm when released and adapted to guide the engaged arm against one of said stops.

19. In a translator to be positioned between the sensing means and a row of type segment control stops of a tabulating machine, a movable arm adapted to cooperate with any stop in said row, a slide plate pivotally supporting said arm, spring means associated with said slide plate and tending to urge the same toward said stops, means restraining said plate against the urge of said spring means, means for oscillating said arm, means for releasing said slide plate from its restraining means, a rack plate adapted to be engaged by said arm to guide said arm against any of said stops, a contactor device arranged to be actuated by the sensing means, and a distributor connected to a source of current for distributing impulses to a circuit including contacts in said device and said releasing means.

20. In a translator to be positioned between the sensing means and the rows of type control segment stops of a record controlled machine, a movable arm adapted to cooperate with any stop in a row of said stops, a lug carried by said arm near one end thereof, a slide plate carrying a pivotal support for said arm, spring means associated with said slide plate, a latch restraining said slide plate against said spring means, means for oscillating said arm, magnetic means for releasing said slide plate from said latch, a rack plate having notches formed therein adapted to be engaged by the lug on said arms and adapted to guide said arm against any of the stops in said row, a contactor device having circuit closing members in cooperative relation with and adapted to be actuated by the sensing means for a single record column, means connecting said circuit closing members to said magnetic means and thereby forming a circuit adapted to be closed under control of records at the sensing means, a distributor connected to a source of current and to said circuit and adapted to distribute a series of impulses to said circuit, and an interrupter between said distributor and said source of current timed to complete a circuit between the distributor and said source after each sensing period and to disconnect said distributor from the source of current after said arm has ceased moving.

21. In a record controlled machine including an accumulator and pin type sensing means, a translator between the sensing means and the accumulator comprising a row of plunger contact members cooperating with pins of said sensing means which pass through holes in a column of the record, a stationary contact member for each of said plunger contacts, a push rod adapted to set a stop in a row of stops for controlling setups in said accumulator, and said push rod being arranged to swing radially in an arc adjacent to said row of stops, a supporting member pivotally carrying said push rod and slidably mounted in said translator, spring means urging said member toward said stops, an electrical controlled latch restraining said member against the urge of said spring means, a circuit including the electrical control for said latch, said row of plunger contacts and an impulse distributor interconnected with said stationary contact members for successively including the latter in said circuit.

22. In a record controlled tabulating machine, a sensing means including a plurality of moving members, a circuit completing means including a plurality of cooperating contactors under control of said moving members, a row of stops for controlling setups in said machine, an interposer adapted to oscillate in a path adjacent to said stops, means for moving said interposer in one direction and in a reverse direction once during each operating cycle of the machine, a slide plate pivotally supporting said interposer, spring means urging said slide plate toward said stops, a latch restraining said slide plate against the urge of said spring means, a magnet for controlling said latch, means connecting the contactors for a given record column in a circuit with said magnet whereby said latch will be actuated when any one of said contactors is closed by the sensing means, and means for supplying electrical impulses to said circuit in timed relation to a portion of the operating cycle of the machine during which said interposer is moved in one of said directions, thereby permitting said spring means to move said interposer into engagement with one of said stops.

23. In a record controlled machine of the pin sensing type having a printing member and stops for effecting setups thereof, a translator including an interposer movable in timed relation to a portion of a record cycle of the machine, a slide plate associated with and forming a support for said interposer, spring means urging said interposer in one direction, another different spring means urging said plate in a direction angular with respect to said first direction, a moving mechanical member in contact with said interposer and permitting the same to move in the direction of the urge of said first spring means during said portion of the record cycle and adapted thereafter to reset said interposer, a latch restraining said plate against the urge of said second spring means, a magnetic release associated with said latch, a contactor device including a plurality of pairs of contacts adapted to be actuated by sensing pins, a circuit including said contact elements and said magnetic release, means supplying current to said circuit while said interposer is in motion, and a resetting member driven by said machine and adapted to move said plate against the urge of said second spring means while said mechanical member is resetting said interposer.

24. In a translator of the character described for record controlled machines, including an accumulator and stops arranged in a row for effecting setups therein, and mechanical sensing pins, a contact element assembly including a plurality of contact members adapted to be closed by said pins passing through holes in a given record column, an oscillating interposer element moving in a path adjacent to said row of stops, spring means urging said interposer toward said stops, electrical control means normally preventing said interposer from moving toward said stops, a circuit including said electrical control means, said contact elements and a distributor for initiating a series of differentially timed sequential impulses during a portion of a record cycle in which said interposer element is oscillated to effect the release of said interposer element under control of a perforation in said record column, thereby permitting the same to set one of said stops.

25. In a device of the character described, an engageable guide member, a movable stop setting member, means for moving said stop setting member in a path adjacent to said guide member, a supporting member for said stop setting member, spring means tending to move said supporting member in a direction angular with respect to the movement of said stop setting member, restraining means holding said supporting member against said spring means, electromagnetic means adapted to disengage said restraining means from said supporting member, thereby permitting said stop setting member under the influence of said spring means to move in said direction whereupon it engages said guide member and ceases moving in its normal path and under the guidance of said guiding member to set a stop, and impulse instituting means under control of perforated records for controlilng the energization of said electromagnetic means.

LINCOLN M. KEEFE.